United States Patent [19]
Redman

[11] Patent Number: 5,875,600
[45] Date of Patent: Mar. 2, 1999

[54] DOOR CORNER JOINT WITH FORCE TRANSFER BLOCK

[75] Inventor: Ronald E. Redman, Lawrenceville, Ga.

[73] Assignee: Kawneer Company, Inc., Norcross, Ga.

[21] Appl. No.: 784,706

[22] Filed: Jan. 16, 1997

[51] Int. Cl.[6] ..................................... E04C 2/38
[52] U.S. Cl. ........................ 52/656.4; 52/656.9; 403/230; 403/254; 403/257
[58] Field of Search ................................... 52/656.4, 455, 52/456, 458, 656.9, 656.5; 403/230, 252, 253, 254, 256, 257, 260

[56] References Cited

U.S. PATENT DOCUMENTS

| | | | |
|---|---|---|---|
| 3,816,611 | 6/1974 | Biebuyck et al. | 403/260 X |
| 3,828,516 | 8/1974 | Kern | 52/656.9 X |
| 5,618,127 | 4/1997 | Tonsmann et al. | 403/230 |

FOREIGN PATENT DOCUMENTS

| | | | |
|---|---|---|---|
| 2119246 | 8/1972 | France | 403/230 |
| 2562174 | 10/1985 | France | 403/230 |

*Primary Examiner*—Creighton Smith
*Attorney, Agent, or Firm*—Jones & Askew, LLP

[57] ABSTRACT

An improved joint construction for commercial metal doors is disclosed which utilizes a novel force transfer block. The force transfer block has spaced-apart flanges which engage corresponding reglets in a door stile. The inner faces of the flanges bear against the inner walls of the reglets. The flanges of the force transfer block are configured such that they will retain the block on the stile by way of an interference fit with the walls of the reglet. Thus the block does not have to be separately fastened to the stile. A rail abuts the stile and has a recessed portion into which the block is received. A threaded rod extends through the rail and into the stile, and tightening a threaded fastener onto each end of the rod clamps the rail securely between two stiles. The recessed portion of the rail has surfaces bearing snugly against at least two sides of the block such that twisting forces applied to the rail are transferred to the block. Twisting forces transferred to the block from the rail are transferred by the inner faces of the flanges to the inner walls of the reglets.

6 Claims, 9 Drawing Sheets

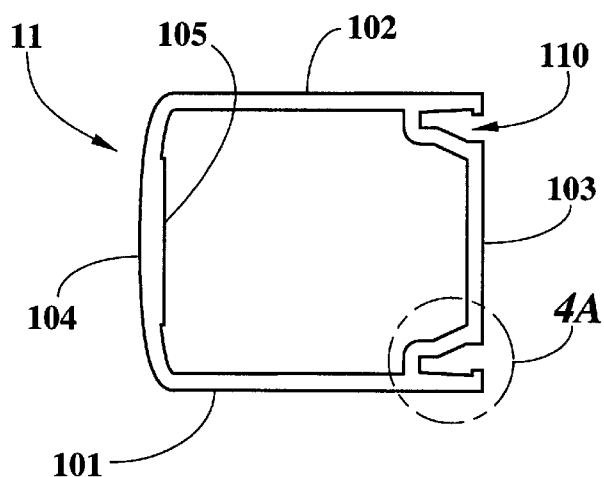
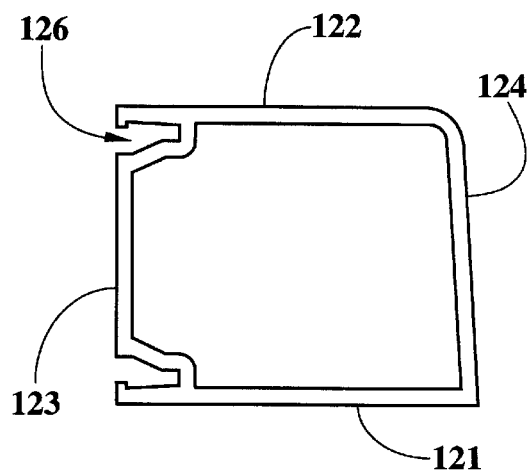
*Fig. 4*  *Fig. 5*
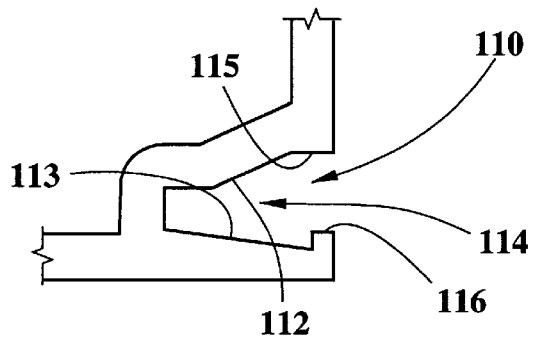
*Fig. 4A*
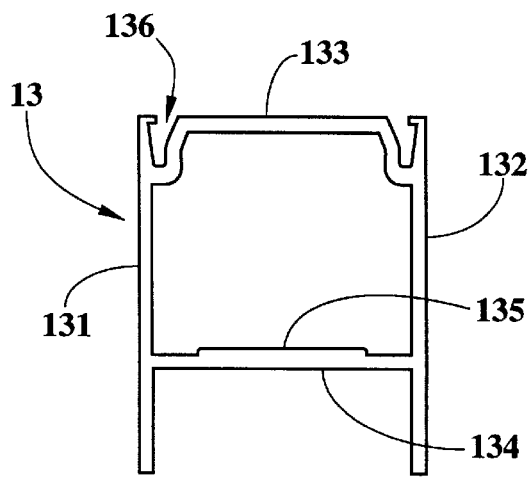
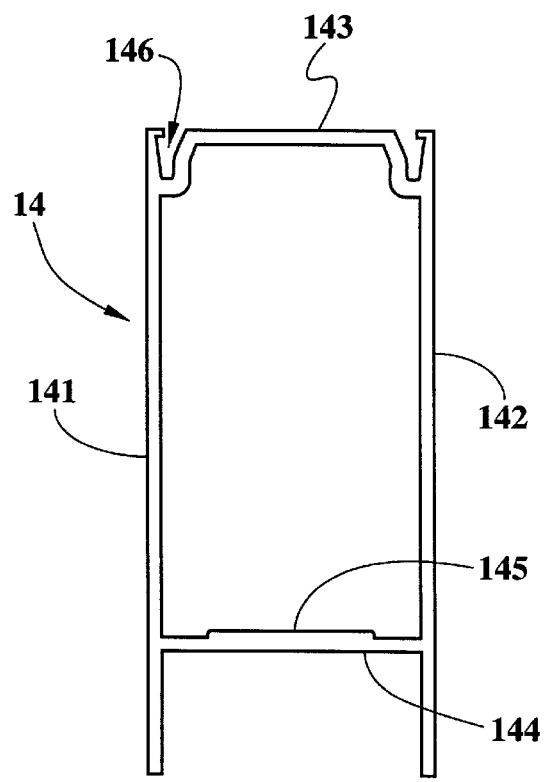
*Fig. 6*  *Fig. 7*

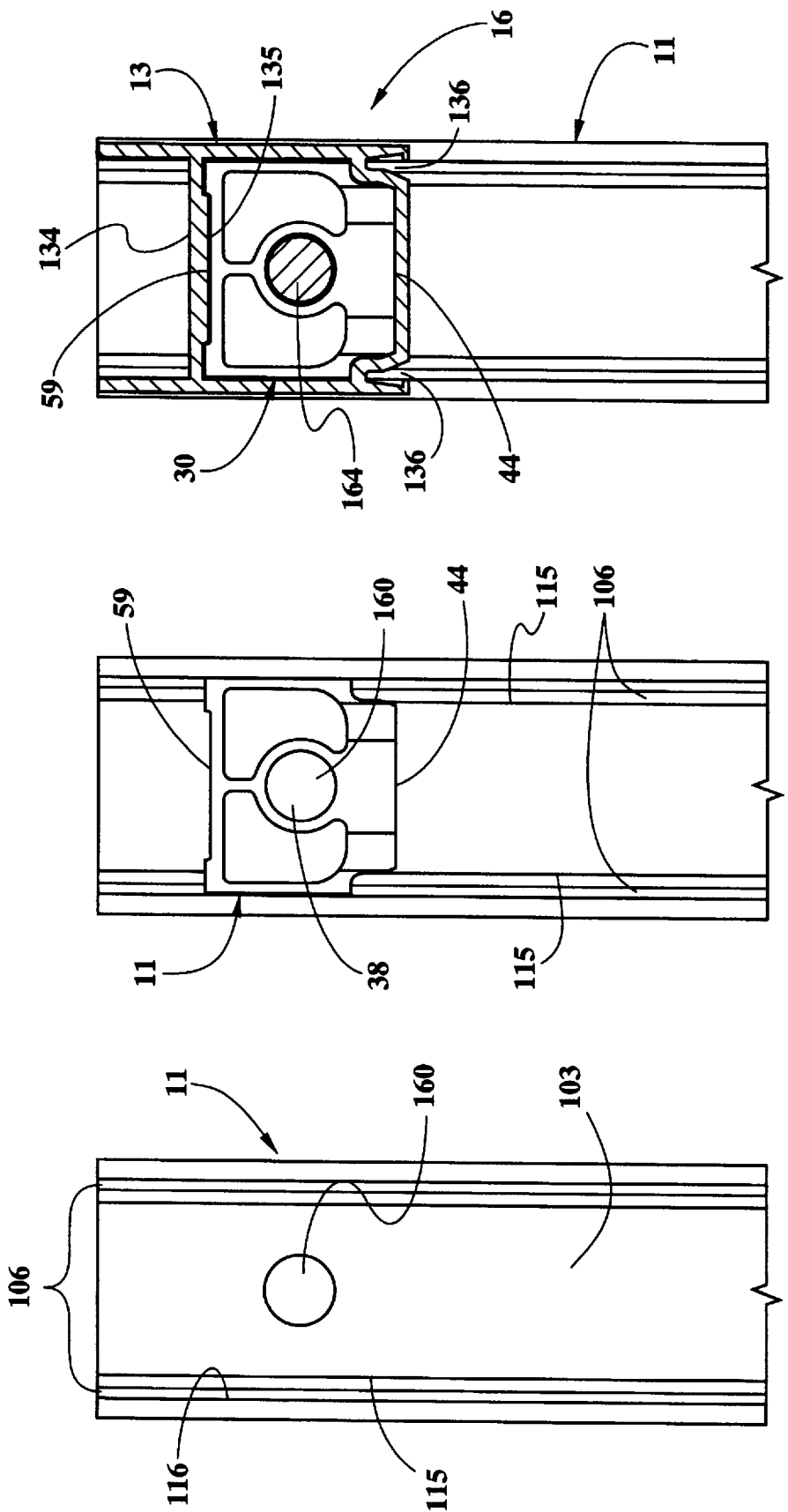

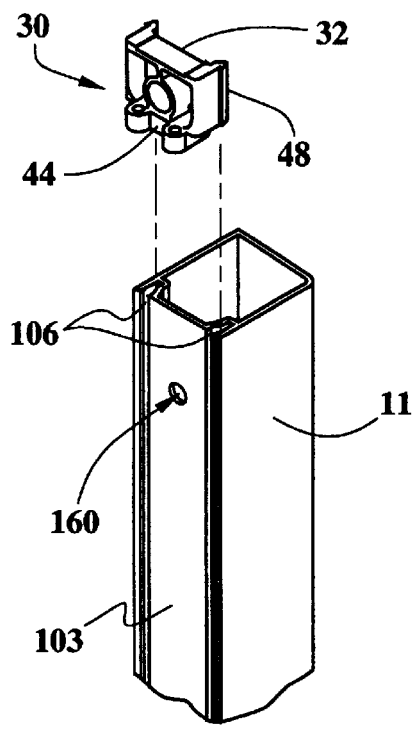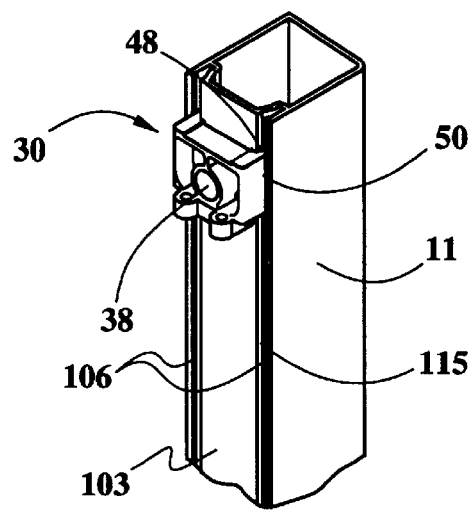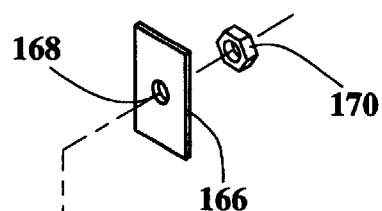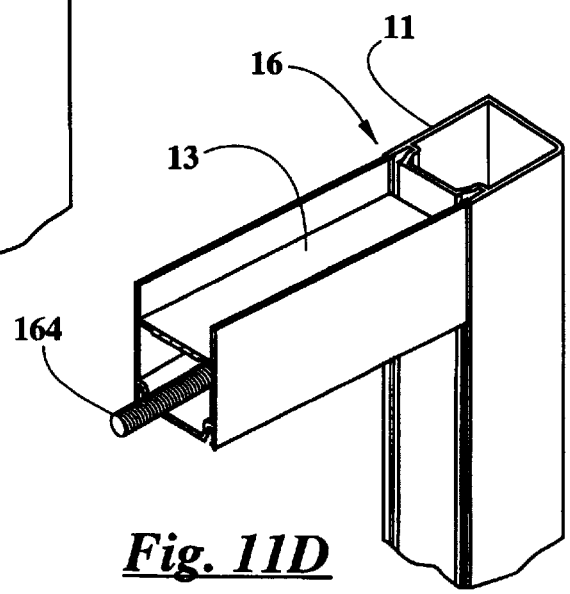
Fig. 11A
Fig. 11B
Fig. 11C
Fig. 11D

DOOR CORNER JOINT WITH FORCE TRANSFER BLOCK

TECHNICAL FIELD

The present invention relates generally to doors, and relates more specifically to an improved corner joint for tie-rod doors which uses a novel force transfer block to enable the joint to resist twisting and racking.

BACKGROUND OF THE INVENTION

Commercial metal doors are typically comprised of vertical stiles interconnected by top and bottom rails. Optionally an intermediate rail can be used to provide additional structural rigidity. Infill panels such as glass lites are set in the rectangular openings defined by the stiles and rails.

The stiles and rails are typically comprised of hollow frame members of aluminum or other suitable material. One problem associated with conventional metal commercial doors concerns the joints between stiles and rails. Commercial doors are typically subject to heavy use and abuse, which cause the door to be twisted and racked. This twisting and racking exerts substantial force on the corner joints. While many prior art commercial doors have corner joints which can withstand these forces, manufacture of the corner joint components is expensive, and the doors can be time-consuming and labor-intensive to assemble. Prior art efforts to provide a corner joint design with lower cost components and which can be assembled more quickly and with less labor have resulted in corner joints which are subject to failure from the twisting and racking which result from heavy use.

Thus there is a need for an improved commercial metal door having corner joints which employ less expensive components, can be assembled quickly and with a minimum of labor, and yet will exhibit structural integrity to withstand the rigors of heavy use.

Corner joints for prior art commercial doors have typically fallen into one of two categories. In a first category, shear blocks are anchored to the glazing face of each door stile with threaded fasteners. The open ends of the rails are then advanced over the shear blocks, and screws are inserted through a glazing face of the rails and into the respective shear blocks. Tightening the screws draws the rails snugly against each stile and anchors the rails to the stiles. While this arrangement makes for a sturdy joint, the shear blocks must be designed to withstand heavy forces, as the shear block provides the sole structural connection between the stiles and the rails. In addition, the requirement that the shear block be screwed to the stile and that the rail be screwed to the shear block makes assembly labor-intensive.

The second category consists of tie-rod doors. A clip is mounted within a track on the glazing face of the stile. The block has a circular bore which overlies a similar bore in the glazing face of the stile. A threaded rod extends longitudinally through each rail and project from each end. The projecting ends of the tie rod are inserted through the clips and into the stiles. The clip fits snugly within the open end of the rail. Threaded fasteners within the stiles are threaded onto the ends of each rod to draw the rail against the stiles and to connect the rail to the stiles. The engagement of the clip within its track prevents the clip from rotating. In turn, the clip fits snugly within the open end of the rail to prevent the rail from turning.

Since the tie-rod, and not the clip, is the primary structural connection between the rail and the stiles, and since the only purpose of the clip is to prevent the rail from twisting, the clip need not exhibit the structural strength of a shear block and can thus be fabricated from lighter weight, less expensive materials. In addition, since the track holds the clip in place without the need for screwing the clip to the door stile, and since the threaded rod holds the rail against the door stile without the need for screwing the rail to a shear block, installation requires less labor.

However, prior art tie-rod doors have been found to provide joints having less than optimal structural integrity. As the door is twisted or racked, causing the rail to exert a rotational force against the clip, the corners of the clip impart these forces against the outer wall of the stile. Because these forces are concentrated on a relatively small area of the wall of the stile, and because the outer walls of the stile are not designed to withstand such concentrated forces, the stile over time will begin to deform. The result is that the clip has more "play" to rotate within its track, and the rail in turn begins to exhibit a certain degree of rotation with respect to the stile. As the joint loses its integrity, the door frame deforms as it is subjected to twisting and racking.

Thus there is a need for an improved corner joint for tie-rod doors which exhibits improved resistance to twisting.

SUMMARY OF THE INVENTION

Stated generally, the present invention comprises an improved commercial metal door having corner joints which employ inexpensive components. The door can be assembled quickly and with a minimum of labor, and yet will exhibit structural integrity to withstand the rigors of heavy use. Despite using inexpensive components, the door exhibits improved resistance to twisting and racking.

Stated somewhat more specifically, the present invention relates to an improved joint construction for commercial metal doors which utilizes a novel force transfer block. A door stile has reglets defined therewithin. The force transfer block has spaced-apart flanges which engage the reglets in the stile. The inner faces of the flanges bear against the inner walls of the reglets. A rail has a recessed portion into which the block is received, the recessed portion having surfaces bearing snugly against at least two sides of the block such that twisting forces applied to the rail are transferred to the block. Twisting forces transferred to the block from the rail are transferred by the inner faces of the flanges to the inner walls of the regrets. In a preferred embodiment a threaded rod extends through the rail and into the stile, and tightening a threaded fastener onto each end of the rod clamps the rail securely between two stiles. Also in the preferred embodiment, the flanges of the force transfer block are configured such that they will retain the block against the stile by way of an interference fit with the walls of the reglet. Thus the block does not have to be separately fastened to the stile.

Thus it is an object of the present invention to provide an improved commercial metal door.

It is another object of the present invention to provide an improved commercial metal door having corner joints which employ inexpensive components.

Another object of the present invention is to provide an improved commercial metal door having corner joints which, while employing less expensive components, will nonetheless exhibit structural integrity to withstand the rigors of heavy use It is a further object of the present invention to provide an improved commercial metal door having corner joints which can be assembled quickly and with a minimum of labor.

It is yet another object of the present invention to provide an improved commercial metal door made from inexpensive components which exhibits improved resistance to twisting and racking.

Other objects, features, and advantages of the present invention will become apparent upon reading the following specification, when taken in conjunction with the drawings and the appended claims.

BRIEF DESCRIPTION OF THE DRAWINGS

FiG. 4 is an end view of a lock stile of the door of FIG. 1.

FIG. 4A is an enlarged view of the portion of the lock stile of FIG. 4 indicated by the circle 4A.

FIG. 5 is an end view of a pivot stile of the door of FIG. 1.

FIG. 6 is an end view of a top rail of the door of FIG. 1.

FIG. 7 is an end view of a bottom rail of the door of FIG. 1.

FIGS. 10A–C are elevation views showing the assembly sequence of a corner joint of the door of FIG. 1, with FIG. 10A showing the stile, FIG. 10B showing the transfer block mounted to the stile; and FIG. 10C showing a rail and tie rod mounted onto the stile and transfer block.

FIGS. 11A–D are perspective views showing the assembly sequence of a corner joint of the door of FIG. 1, with FIG. 11A showing a transfer block exploded away from a stile; FIG. 11B showing the transfer block mounted to the stile; FIG. 11C showing a rail and tie rod about to be mounted to the stile and transfer block, and FIG. 11D illustrating the assembled corner joint.

DETAILED DESCRIPTION OF THE DISCLOSED EMBODIMENT

Figure 1:
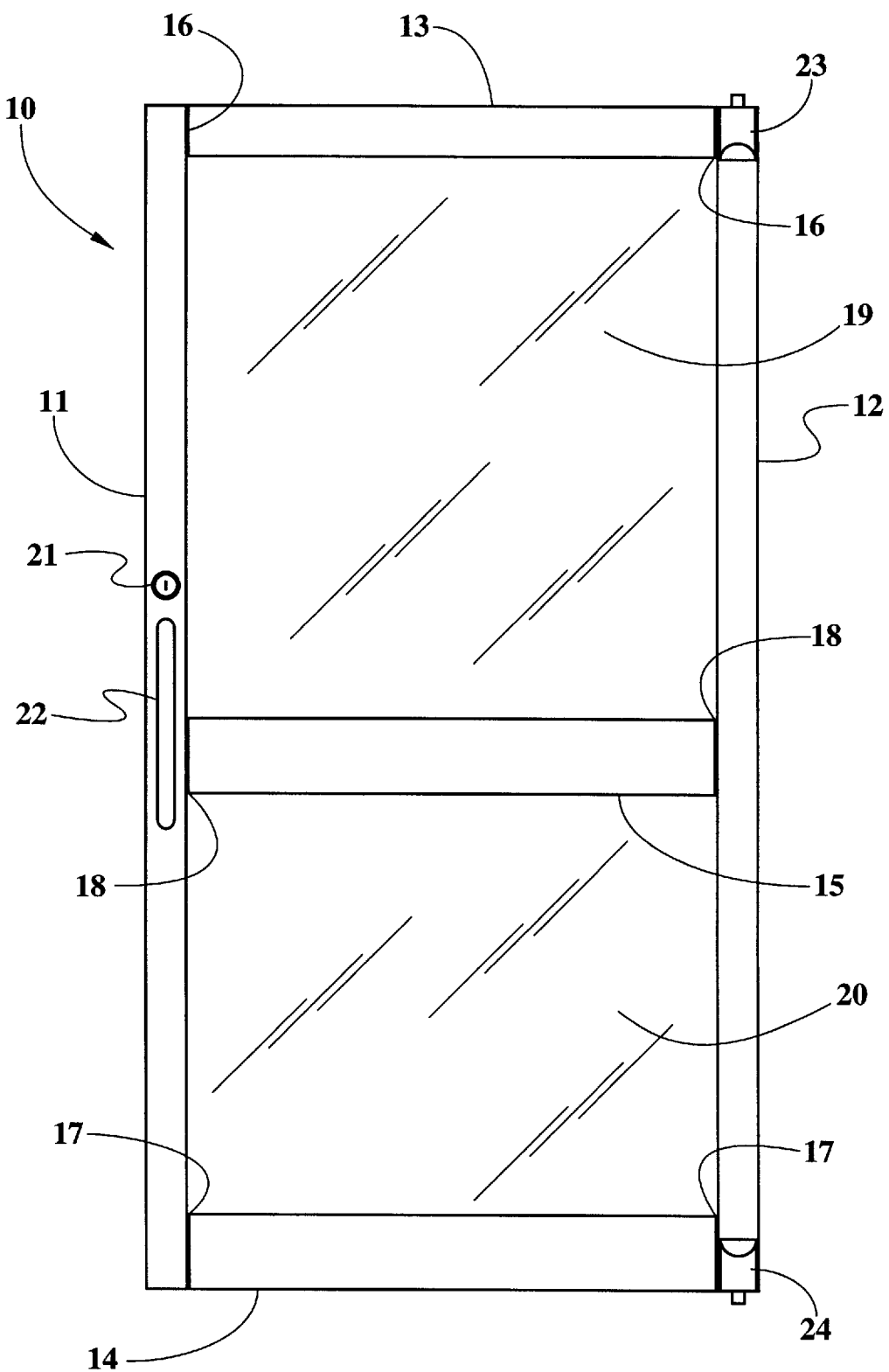
FIG. 1 is a front elevation view of a disclosed embodiment of a commercial metal door according to the present invention.

Referring now to the drawings, in which like numerals indicate like elements throughout the several views, FIG. 1 shows a door 10 comprising a vertical lock stile 11 and a vertical pivot stile 12. A horizontal top rail 13 joins the stiles 11, 12 at their upper ends, and a horizontal bottom rail 14 joins the stiles at their lower ends. The door 10 further comprises an optional intermediate rail 15 extending between the stiles 11, 12 at an intermediate location. The top rail 13 is joined to the stiles 11, 12 at top corner joints 16, the bottom rail 14 is joined to the stiles at bottom corner joints 17, and the intermediate rail 15 is joined to the stiles at intermediate joints 18.

Infill panels such as glass lites 19, 20 are set in the rectangular openings defined by the stiles 11, 12 and the rails 13–15. Conventional door hardware including a lock 21 and door handle 22 are mounted to the lock stile 11. Pivots 23, 24 are mounted on the front face of the pivot stile 12 for mounting the door 10 within a door frame (not shown).

In the description which follows, terms such as "front," "back," "top," "bottom," "left," "right," and the like will be used. However, it will be understood that these terms are used for convenience and ease of description only and are not intended to limit the invention to any particular orientation.

Referring now to FIGS. 2A–E, a first embodiment of a corner block 30 is illustrated. The corner block 30 of the disclosed embodiment is molded from a high grade fiberglass-reinforced plastic. Without limiting the invention to any particular composition, a suitable material for the corner block 30 is Vertron RF 70010 EMHS. The corner block 30 comprises a front face 31, a back face 32, and left and right side walls 33, 34. A smooth-walled clearance hole 38 extends through the block 30 through the front and back faces 31, 32 of the block. Depressions 40 are formed in the front face 31 of the block 30 around the clearance hole 40 to save material. A rib 42 is formed between the depressions 40 to reinforce the walls defining the clearance hole 38.

A screw boss 44 is formed at the upper end of the block 30. A pair of generally vertical smooth bores 45 extend through the screw boss 44 adjacent its forward end 46.

Flanges 48 extend rearward from the back face 32 of the block 30 along each lateral edge thereof. The flanges 48 begin at the lower end of the block 30 and extend upward, terminating at an upper edge 49 which is located adjacent the lower end of the screw boss 44. Each flange 48 has an inner face 50, an outer face 51, and a head portion 52 formed at its rear edge. The head portion 52 comprises a beveled inner wall 54 and a beveled outer wall 55. The outer edge 56 of each beveled outer wall 55 extends outward of its corresponding side wall 33, 34 to form a hook 57.

As used to describe the faces 50, 51 of the flanges 48, the term "inner face" is used to identify the faces 50 of the two flanges which are mutually facing, and the term "outer face" is used to identify the face 51 of each flange which faces outward away from the other flange. The terms "inner" and "outer" are not intended to suggest any particular orientation with respect to the interior or exterior of a building to which the door 10 may be mounted.

At the lower end of the block 30 is a bottom wall 58. A channel 59 defined in the bottom wall 58 extends from the front face 31 to the rear face 32 of the block. The purpose and function of the channel 59 will be described below.

Figure 2A:
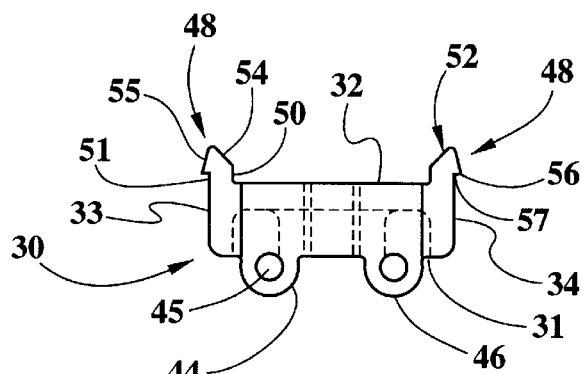
FIG. 2A is a top view of a first embodiment of a transfer block for use in a corner joint of the door of FIG. 1.
Figure 2F:
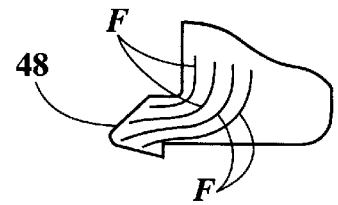
FIG. 2F is a top view schematic diagram of a portion of the corner block of FIG. 2A showing the alignment of fibers in a flange of the corner block.
Figure 2B:
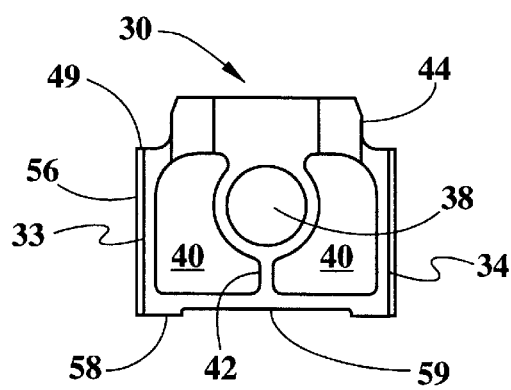
FIG. 2B is a front view of the transfer block of FIG. 2A.
Figure 2C:
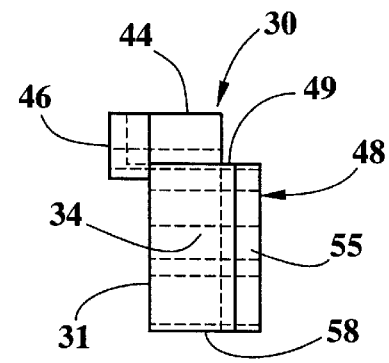
FIG. 2C is a side view of the transfer block of FIG. 2A.
Figure 2D:
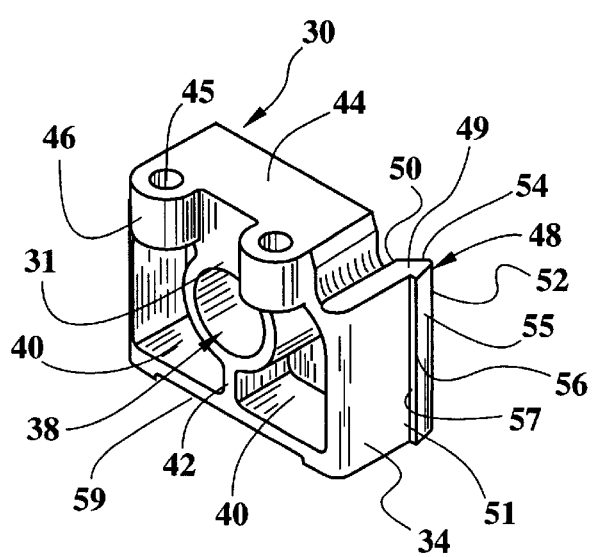
FIG. 2D is a front perspective view of the transfer block of FIG. 2A.
Figure 2E:
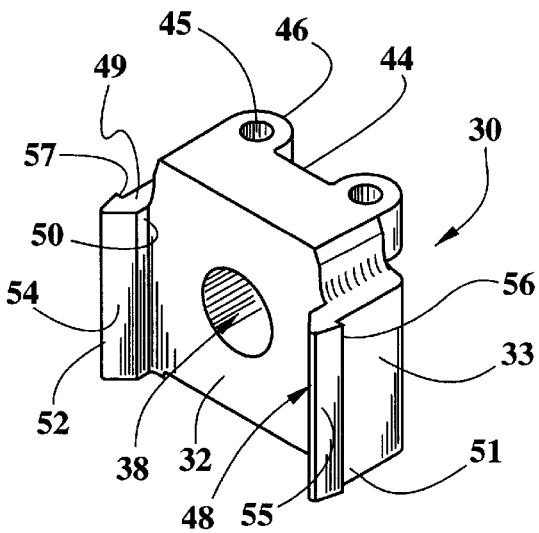
FIG. 2E is a rear perspective view of the transfer block of FIG. 2A.
Figure 3A:
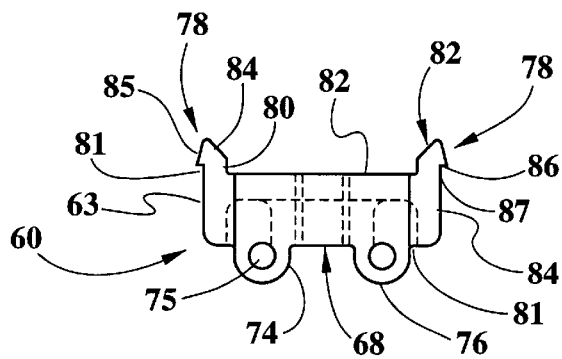
FIG. 3A is a top view of a second embodiment of a transfer block for use in a corner joint of the door of FIG. 1.
Figure 3B:
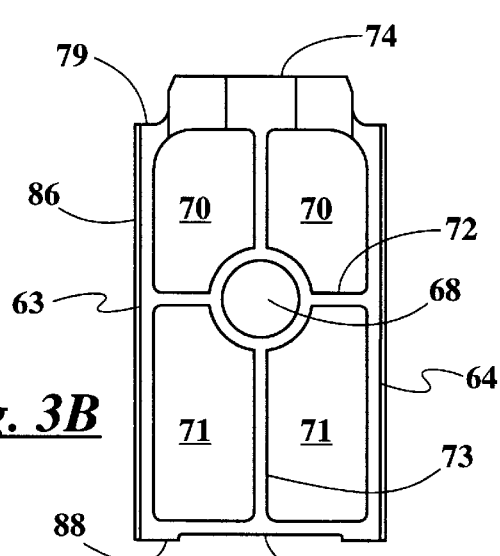
FIG. 3B is a front view of the transfer block of FIG. 3A.
Figure 3C:
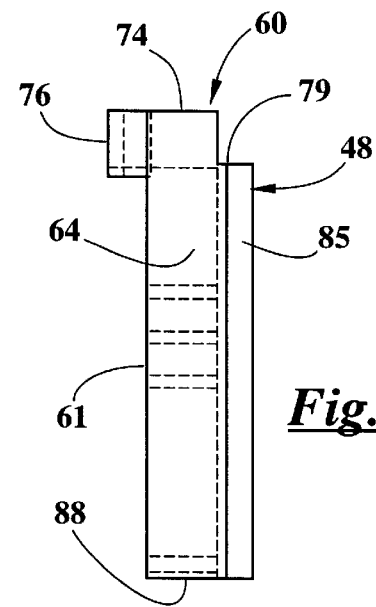
FIG. 3C is a side view of the transfer block of FIG. 3A.
Figure 3D:
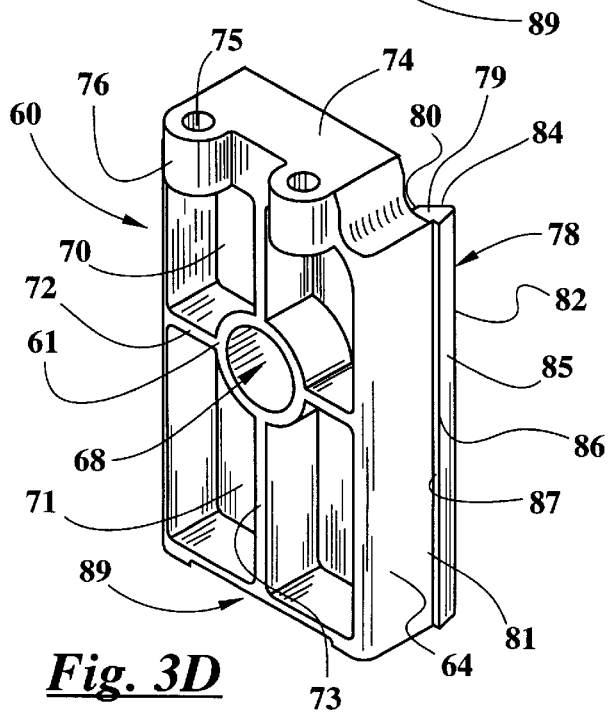
FIG. 3D is a front perspective view of the transfer block of FIG. 3A.
Figure 3E:
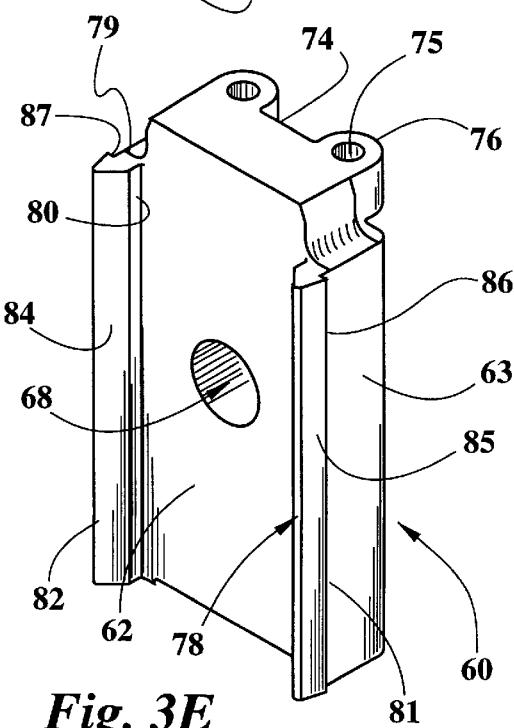
FIG. 3E is a rear perspective view of the transfer block of FIG. 3A.

As mentioned above, the corner block 30 of the disclosed embodiment is molded from a fiberglass-reinforced plastic. To maximize the strength of the flanges 48, the corner block 30 is molded in such a way that the fibers F are aligned generally as shown in FIG. 2F.

FIGS. 3A–E illustrate a second embodiment of a corner block 60. The corner block 60 is similar in nearly all respects to the corner block 30 described above, with the primary exception being that the corner block 60 is taller. For convenience of description, the corner block 30 will hereinafter be referred to as a "short" corner block, and the transfer block 60 will be referred to as a "tall" corner block.

The tall corner block 60 comprises front and back faces 61, 62 and left and right side walls 63, 64. A smooth-walled clearance hole 68 extends through the block 60 through the front and back faces 61, 62 of the block. Depressions 70, 71 are formed in the front face 61 of the block 60 around the clearance hole 68 to save material. Horizontal and vertical ribs 72, 73 are defined between the depressions 70, 71 to reinforce walls defining the clearance hole 68.

A screw boss 74 is formed at the upper end of the block 60. A pair of generally vertical smooth bores 75 extend through the screw boss 74 adjacent its forward end 76.

Flanges 78 extend rearward from the back face 62 of the block 60 along each lateral edge thereof. The flanges 78 begin at the lower end of the block 60 and extend upward, terminating at an upper edge 79 which is located adjacent the lower end of the screw boss 74. Each flange has an inner face 80 and an outer face 81. A head portion 82 is formed at the rear edge of each flange 78. Each head portion 82 includes a beveled inner wall 84 and a beveled outer wall 85. The outer edge 86 of each beveled outer wall 85 extends outward of its corresponding side wall 63, 64 to form a hook 87.

As used to describe the faces 80, 81 of the flanges 78, the term "inner face" is used to identify the faces 80 of the two flanges which are mutually facing, and the term "outer face" is used to identify the face 81 of each flange which faces outward away from the other flange. The terms "inner" and "outer" are not intended to suggest any particular orientation with respect to the interior or exterior of a building to which the door 10 may be mounted.

At the lower end of the block 60 is a bottom wall 88. A channel 89 defined in the bottom wall 88 extends from the front face 61 to the rear face 62 of the block.

FIG. 4 shows the lock stile 11. The lock stile 11 is a generally tubular frame member and comprises an exterior face 101, an interior face 102, a glazing web 103, and a tapered lock web 104. The interior of the lock stile 11 is hollow. The central portion 105 of the lock web 104 is thicker than the remaining portion of the glazing web and the other walls of the stile to provide a reinforced structure to which door hardware can be mounted.

At each lateral edge of the glazing web 103 a glazing reglet 110 is formed. Referring to the enlarged view of FIG. 4A, the glazing reglet 110 comprises inside and outside walls 112, 113 defining a generally tapered channel 114. The outer portion of the inside wall 112 of the glazing reglet 110 comprises a bearing surface 115. An inwardly extending lip 116 is formed at the upper edge of the outside wall 113 of the glazing reglet 110, the upper surface of the lip 116 lying generally in the same plane as the upper surface of the glazing web 103.

As used to describe the walls 112, 113 of the glazing reglets 110, the term "inside wall" is used to identify the wall 112 of each reglet which is closest to the other reglet 110, and the term "outside wall" is used to identify the wall 113 of each reglet which is farthest from the other reglet 110. The terms "inside" and "outside" are not intended to suggest any particular orientation of the reglet walls with respect to the interior or exterior of a building to which the door 10 may be mounted.

FIG. 5 shows the pivot stile 12 comprising an exterior face 121, an interior face 122, a glazing web 123, and a pivot web 124 defining a hollow interior. The central portion 125 of the pivot web 124 is thickened to provide a reinforced structure to which door hardware can be mounted. Glazing reglets 126 configured identically to the glazing reglets 110 of the lock stile 11 are formed at each lateral edge of the glazing web 123 of the pivot stile 12.

The top rail 13 is shown in FIG. 6. The top rail 13 includes a pair of opposed side walls 131, 132 and has a glazing web 133 formed at its upper end. Extending between the side walls 131, 132 and spaced upward from their lower ends is a reinforcing web 134. The reinforcing web 134 has a central portion 135 which is thicker than the rest of the web to provide a reinforced structure to which door hardware can be anchored. Glazing reglets 136 are formed at each lateral edge of the glazing web 133. The configuration of the glazing regrets 136 of the top rail 13 is identical to the configuration of the glazing reglet 110 of the lock stile 11.

FIG. 7 shows the bottom rail 14. The bottom rail 14 is similar in nearly all respects to the top rail 130 described above, with the primary exception being that the profile of the bottom rail 14 is taller. The bottom rail 14 includes a pair of side walls 141, 142 and has a glazing web 143 formed at its upper end. Extending between the side walls 141, 142 and spaced upward from their lower ends is a reinforcing web 144. The reinforcing web 144 has a central portion 145 which is thicker than the rest of the web to provide a reinforced structure to which door hardware can be anchored. Glazing reglets 146 similar in configuration to the glazing reglets 136 of the top rail 13 are formed at each lateral edge of the glazing web 143 of the bottom rail 14.

Figure 8:
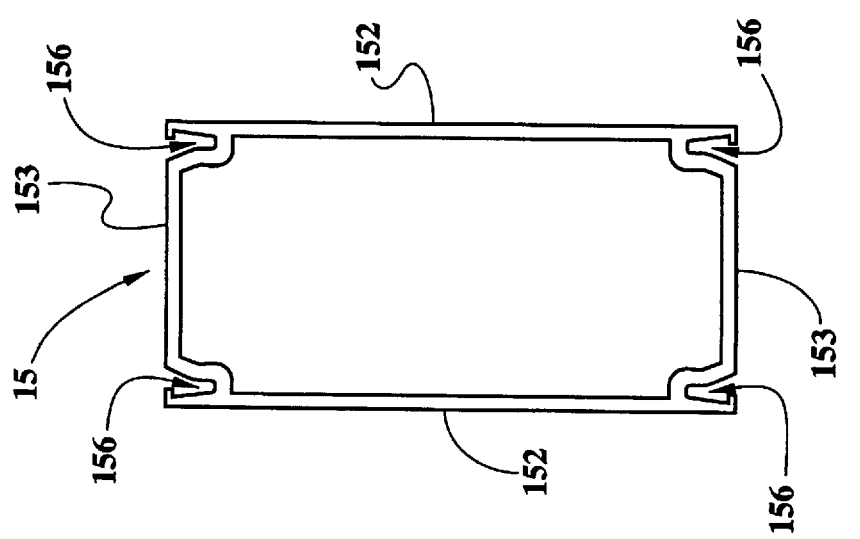
FIG. 8 is an end view of an intermediate rail of the door of FIG. 1.

FIG. 8 is an end view of the intermediate rail 15. The intermediate rail 15 includes opposed side walls 152 and opposed glazing webs 153. Glazing reglets 156 similar in configuration to the glazing reglets 136 of the top rail 13 are formed at each lateral edge of each glazing web 153 of the intermediate rail 15.

Figure 9A:
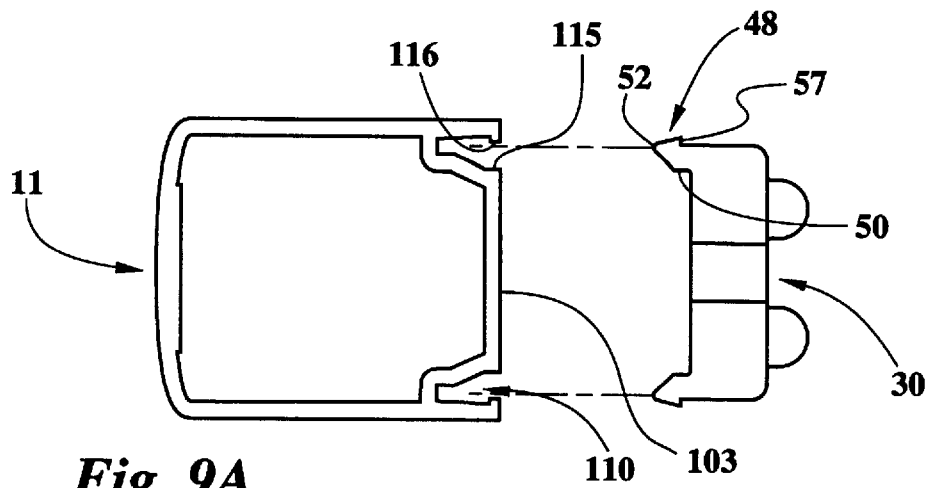
FIG. 9A is a top view of the door stile of FIG. 4 showing the transfer block of FIGS. 2A–E exploded therefrom.
Figure 9B:
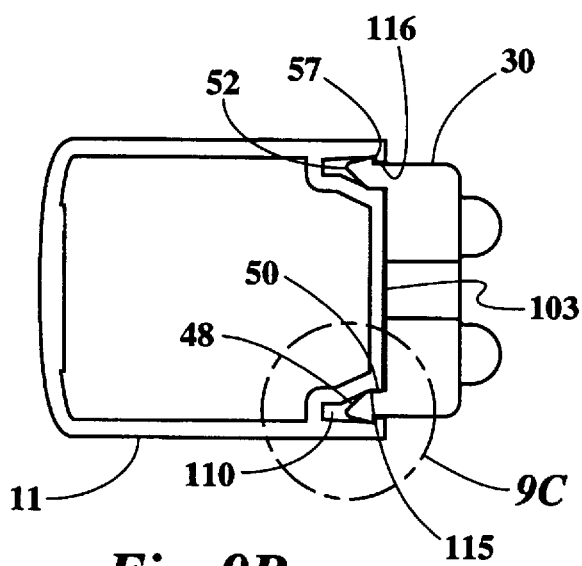
FIG. 9B is a top view showing the transfer block assembled onto the door stile.

Referring now to FIGS. 9A and 9B, the corner block 30 engages the glazing web 103 of the lock stile 11. The head portions 52 of the flanges 48 engage the glazing regrets 110 of the lock stile 11. The hooks 57 of the flanges 48 catch behind the inwardly extending lips 116 to prevent the block 30 from becoming laterally disengaged from the stile 11. The inner faces 50 of the flanges 48 bear against the corresponding bearing surfaces 115 of the glazing reglets 106.

Figure 9C:
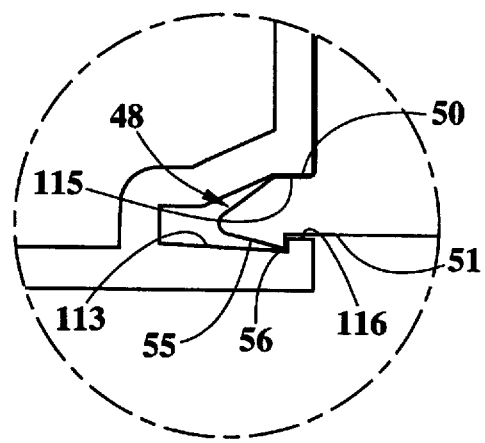
FIG. 9C is an enlarged view of the portion of FIG. 9B indicated by the circle 9C.

As can be seen in the enlarged view of FIG. 9C, the inner face 50 of the flange 48 bears against the bearing surface 115 of the glazing reglet 106. The outer face 51 of the flange 48 is spaced apart from the end of the lip 116, and the outer edge 56 of the bevelled outer wall 55 of the head portion 52 is spaced apart from the outer wall 113 of the glazing reglet 110.

FIGS. 10A–C, 11A–C, and 12 illustrate the assembly of a corner joint 16 by which the top rail 13 is mounted to a stile 11. Referring first to FIGS. 10A and 11A, a smooth hole 160 is formed in the glazing web 103 of the stile 11. With the back wall 32 of the corner block 30 facing the glazing web 103 of the stile 11 and the corner block oriented such that the screw boss 44 is at its lower end, the corner block 30 is slid onto the upper end of the stile 11. The flanges 48 of the corner block 30 engage the glazing reglets 106 in the stile 11 as explained above with respect to FIGS. 9A–C.

Referring next to FIGS. 10B and 11B, the corner block 30 is moved along the face of the glazing web 103 of the stile 11 until the clearance hole 38 of the corner block is in register with the smooth hole 160 in the glazing web 103 of the stile 11. Because of the interference fit between the inner faces 50 of the flanges 48 and the bearing surfaces 115 of the glazing reglets 106, the corner block 30 will retain itself in position against the glazing web 103 of the stile 11 while assembly continues.

With reference now to FIG. 11C, a threaded rod 164 is positioned within the hollow interior of the top rail 13. The threaded rod 164 is approximately three to four inches longer than the rail 13 so as to extend approximately 1½ to 2 inches beyond each end of the rail. With the end of the threaded rod 164 extending through the clearance hole 38 in the corner block 30, the rail 13 is advanced over the corner block 30 until the end of the rail 13 confronts the glazing web 103 of the stile 11.

Figure 12:
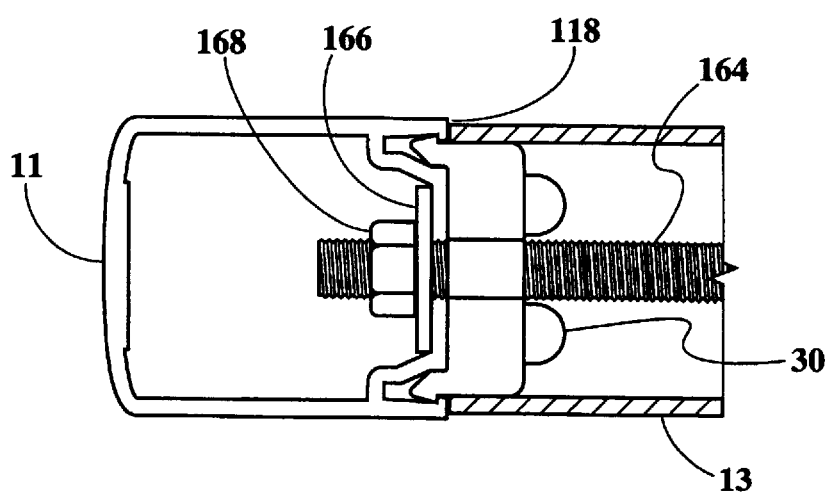
FIG. 12 is a top view of the assembled corner joint of FIGS. 10C and 11D with the top portion of the rail removed to show interior detail.

A plate 166 has a smooth bore 168 formed therewithin dimensioned to receive the threaded rod 164 therethrough. The plate 166 is inserted into the upper end of the stile 11 and placed over the end of the threaded rod 164. As can be seen in FIG. 12, the width of the plate 166 is such as will permit the plate to fit between the glazing reglets 110 and lie flat against the interior face of the glazing web 103. A threaded fastener 170 is then introduced into the upper end of the stile 11 and threaded onto the end of the rod 164.

The completed joint 16 is shown in FIGS. 10C, 11D, and 12. As can be seen in FIG. 10C, the rail 13 fits snugly around the periphery of the corner block 30. The snug fit between the rail 13 and the periphery of the corner block 30 ensures that the rail cannot rotate on the block. The thickened central portion 135 of the lock web 134 of the rail 13 is received within the channel 59 in the bottom wall 58 of the corner block (the bottom wall 58 is shown at the top of the corner block 30 in these drawing figures because of its inverted orientation on the stile 11). The screw boss 44 of the corner block 30 is received between the glazing reglets 136 of the rail 13.

The top corner joint 16 between the top rail 13 and the pivot stile 12 is assembled in the same manner as just described with respect to the top corner joint between the top rail and the lock stile 11. When the rail 13 is assembled to both stiles 11, 12 and the threaded fasteners 170 are tightened on both ends of the threaded rod 164, the rail is clamped securely between the stiles.

Bottom corner joints 17 between the bottom rail 14 and the stiles 11, 12 are assembled in a like manner, using a tall corner block 60 oriented with its screw boss at the upper end of the block.

The foregoing arrangement of using a threaded tie-rod 164 placed under tension to secure the corner joints 16, 17 between the top and bottom rails 13, 14 and the stiles 11, 12 can be used when a rail is being fastened adjacent the upper or lower ends of the stiles, as access can be had through the open ends of the stiles to apply a threaded fastener 170 onto the ends of the tie-rod 164. However, when an intermediate rail 15 is being installed at an intermediate location removed from the ends of the stiles 11, 12, this arrangement is not practical, as there is no way to apply the threaded fastener 170 to the ends of a tie-rod 164. FIGS. 13A–C and 14 illustrate the use of a tall corner block 60 to join an intermediate rail 15 at an intermediate location on the stiles 11, 12.

Figure 13A:
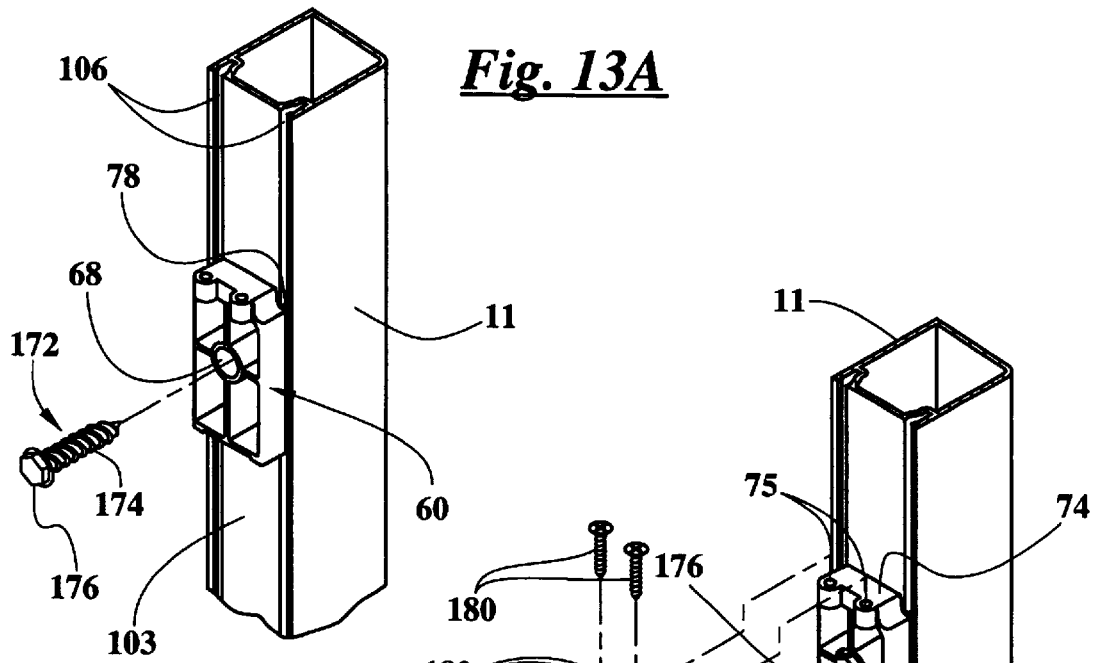
FIGS. 13A–C are perspective views showing the assembly sequence of a joint between a stile and an intermediate rail of the door of FIG. 1, with FIG. 13A showing a transfer block mounted to the stile, FIG. 13B showing the intermediate rail about to be mounted onto the stile and transfer block, and FIG. 13C illustrating the assembled joint.

Referring first to FIG. 13A, the corner block 60 is slid onto the stile 11 from either end with the flanges 78 of the block engaging the glazing reglets 110 in the stile. The block 60 is slid along the glazing web 103 of the stile to a predetermined interemdiate location. A self-tapping fastener 172 has a threaded shank 174 which is dimensioned to be received through the clearance hole 68 of the corner block 60 and a head portion 176 which is larger than the clearance hole 68. The threaded shank 174 of the fastener 172 is inserted through the clearance hole 68 of the corner block 60 and screwed into the underlying glazing web 103 of the stile 11. The fastener 172 is tightened until the head portion 176 bears against the front face 61 of the corner block 60 and anchors the corner block securely against the glazing web 103.

Figure 14:
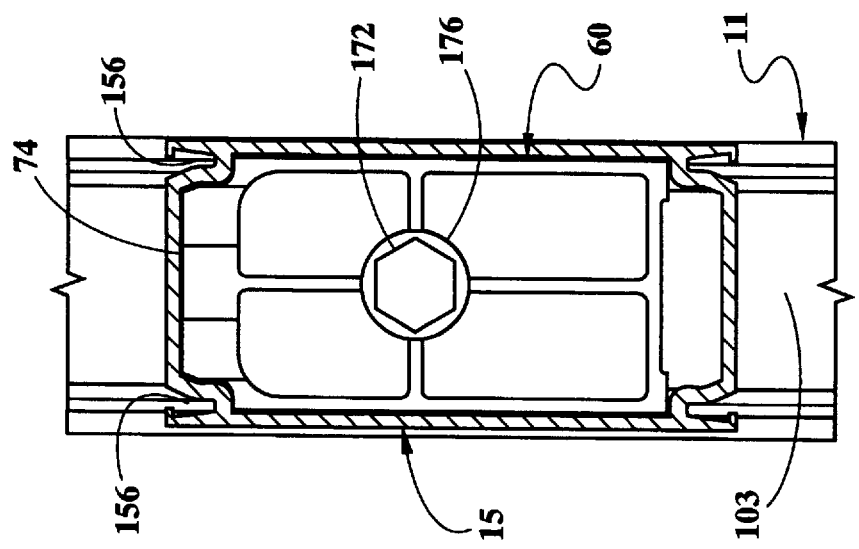
FIG. 14 is an elevation view of an intermediate rail positioned on the transfer block and stile of FIG. 13A.
Figure 13B:
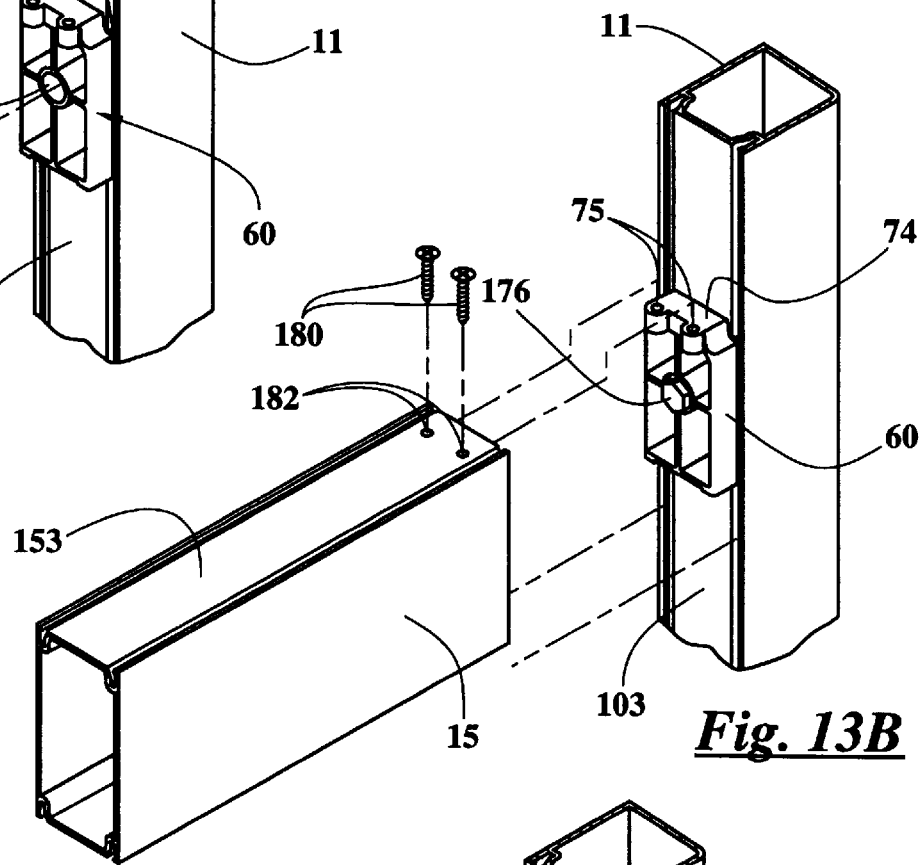
Figure 13C:
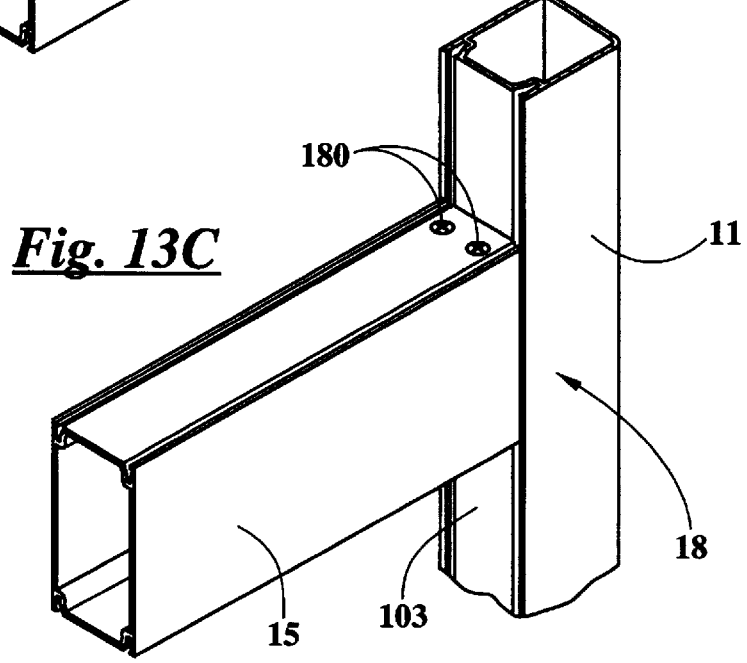

With reference now to FIG. 13B, the intermediate rail 15 is advanced over the installed corner block 60. As can be seen in FIG. 14, the screw boss 74 fits between the glazing regrets 156 at the upper end of the intermediate rail 15, with the upper end of the screw boss 74 bearing against the inner surface of the upper glazing web 153.

Referring now to FIGS. 13B and C, screws 180 are inserted through corresponding holes 182 in the glazing web 153 of the rail 15 and threaded into the bores 75 in the screw boss 74 of the glazing block 60. As the screws 180 are tightened, the end of the rail 15 is drawn tightly against the stile 11, anchoring the rail to the stile.

Figure 15:
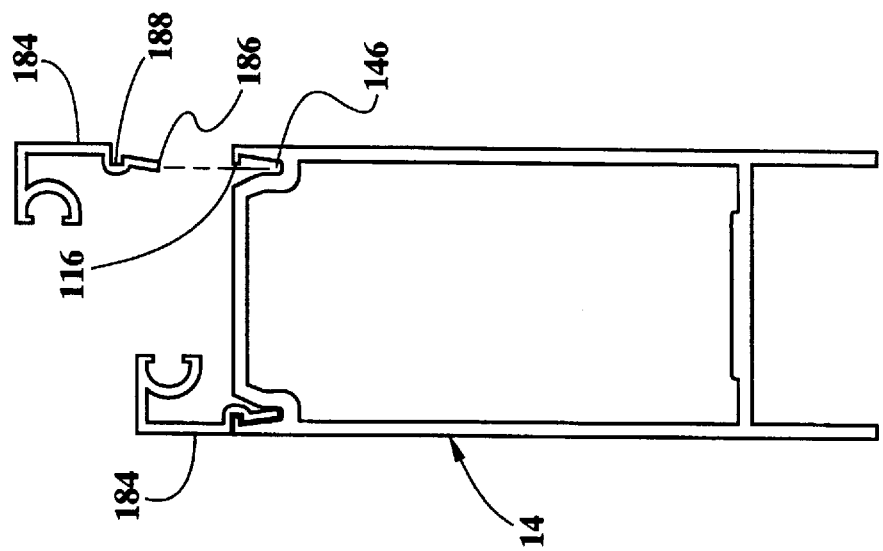
FIG. 15 is an end view of the bottom rail of FIG. 7 and a cooperating glazing block.

Once the stiles 11, 12 and rails 13–15 have been assembled, infill panels 19 and 20 such as glass lites are set into the rectangular openings defined by the stiles and rails. The glazing reglets 110, 126, 136, 146, 156 in the stiles 11, 12 and rails 13–15 are now used for their primary purpose, that is, to glaze the infill panels 19 and 20. With reference to FIG. 15, and using a bottom rail 14 for purposes of example, glazing blocks 184 have tongue proportions 186 which engage the glazing reglets 146 as illustrated. An outward facing recess 188 in the glazing block 184 receives the inwardly projecting lip 116 of the glazing reglet 146, and the tongue portion 186 fits snugly into the lower end of the tapered channel of the glazing reglet. The remainder of the glazing process is conventional and will not be described in further detail.

Operation of the disclosed embodiment will now be explained with reference to a top corner joint 16 between the top rail 13 and the lock stile 11. As the door 10 is subjected to normal use, forces exerted against the door to open and close it will tend to set up twisting and wracking forces within the door frame. One component of these forces is a rotational force within the rail 13 about its longitudinal axis. As the rail 13 tends to twist about its axis, the snug fit between the rail and the associated corner block 30 transfers these twisting forces to the block. The block 30, in turn, transfers these forces to the door stile 11 by way of the engagement between the inner faces 50 of the flanges 48 of the block and the bearing surfaces 115 of the inner walls 112 of the reglets 110 in the stile 11. Because the corner block 30 transfers the rotational forces from the rail 13 to the stile 11, the corner block is also referred to as a "force transfer block."

Again using the same corner joint 16 as an example, one feature of the disclosed embodiment is that the flanges 48 of the block 30 engage the inner walls 112 of the regrets 110 but not the outer walls 113. Thus all of the rotational forces are exerted against portions of the walls of the regrets which are structurally reinforced by the glazing web 103 and not against the unreinforced outer walls.

Another feature of the disclosed embodiment is that the interference fit between the inner faces 50 of the flanges 48 of the block 30 and the bearing surfaces 115 of the reglets 110 in the stile 11 is sufficient to prevent the block from sliding freely on the stile. Thus the block 30 can be positioned on the stile 11 and will remain in place without need for a separate fastener as installation continues.

Another feature of the disclosed embodiment is that the corner blocks 30, 60 are molded from high grade fiber-reinforced plastic, rather than being formed from aluminum as has heretofore been the industry standard. Though plastic is inherently weaker than aluminum, the entrapment of the corner blocks 30, 60 on the glazing web gives the plastic block a solid base to transfer a rotational force from a twisting rail to the stile. Also, because plastic is inherently less expensive than aluminum, the blocks 30, 60 can be made larger, thereby increasing the surface contact between the rails and the block to facilitate force transfer. Finally, in contrast to a symmetrical configuration which would be necessitated by extruding a component from aluminum, a molded plastic corner block 30, 60 can be asymmetrical, thereby permitting such features as the screw bosses 44, 74.

The corner blocks 30, 60 of the disclosed embodiment thus meets all of the needs previously identified. They are inexpensive to manufacture and easy to install, requiring a minimum of labor. They also permit a tie-rod type door corner joint to exhibit improved resistance to twisting and racking and to provide the structural integrity needed to withstand heavy use in commercial applications.

Finally, it will be understood that the preferred embodiment has been disclosed by way of example, and that other modifications may occur to those skilled in the art without departing from the scope and spirit of the appended claims.

What is claimed is:

1. A door comprising:
    a stile having first and second reglets defined therewithin, said reglets each having an inner wall and an outer wall;
    a force transfer block having first and second spaced-apart flanges engaging said first and second reglets in said stile, said flanges each having an inner face, said inner faces of said flanges bearing against said inner walls of said reglets; and
    a rail having a recessed portion into which said block is received, said recessed portion having surfaces bearing snugly against at least two sides of said block such that twisting forces applied to said rail are transferred to said block;
    whereby twisting forces transferred to said block from said rail are transferred by said inner faces of said flanges to said inner walls of said first and second reglets.

2. The door of claim 1, wherein said stile comprises a first stile and has a hole formed therethrough, wherein said force transfer block has a corresponding hole formed therethrough in alignment with said hole in said first stile, and wherein said door further comprises:
    a second stile in parallel, spaced-apart relation to said first stile;
    a rod disposed within said rail, said rod having a first threaded end extending from said rail, through said hole in said force transfer block, and through said hole in said stile, and said rod having a second end anchored to said second stile; and
    a threaded fastener engaging said first threaded end of said rod to anchor said rod to said first stile.

3. The door of claim 1, wherein said stile further comprises a lip operatively associated with each of said regrets, and wherein said flanges of said force transfer block each have cooperating hook portions which engage a corresponding one of said lips.

4. The door of claim 1, wherein said block is configured such that said flanges do not contact said outer walls of said reglets, whereby twisting forces transferred to said block from said rail are transferred to said inner walls of said first and second reglets but not to said outer walls of said first and second regrets.

5. The door of claim 1, wherein said flanges are configured to retain said force transfer block against said stile by way of an interference fit between said flanges and said inner walls of said reglets.

6. The door of claim 1, wherein said reglets comprise glazing regrets, and wherein said door further comprises glazing blocks engaging said glazing reglets for retaining a glazing panel against said stile.

* * * * *